US008857674B2

(12) United States Patent
Nighy et al.

(10) Patent No.: US 8,857,674 B2
(45) Date of Patent: *Oct. 14, 2014

(54) PISTON PUMP AND DRIVER THEREFOR

(75) Inventors: Richard John Nighy, Stratford upon Avon (GB); Daniel Peterson Godfrey, Cambridge (GB); Lucy Ann Sheldon, Cambridge (GB); Nicholas Martin Broadbent, Cambridge (GB); Sam Gilbert Willis, Stamford (GB)

(73) Assignee: Cornelius, Inc., St. Paul, MN (US)

( * ) Notice: Subject to any disclaimer, the term of this patent is extended or adjusted under 35 U.S.C. 154(b) by 1127 days.

This patent is subject to a terminal disclaimer.

(21) Appl. No.: 12/448,828

(22) PCT Filed: Jan. 9, 2008

(86) PCT No.: PCT/GB2008/000080

§ 371 (c)(1),
(2), (4) Date: Oct. 6, 2010

(87) PCT Pub. No.: WO2008/084235

PCT Pub. Date: Jul. 17, 2008

(65) Prior Publication Data

US 2011/0042413 A1 Feb. 24, 2011

(30) Foreign Application Priority Data

Jan. 9, 2007 (GB) .................................. 0700334.6
Jun. 19, 2007 (GB) .................................. 0711812.8

(51) Int. Cl.

| | |
|---|---|
| ***G01F 11/00*** | (2006.01) |
| ***B65D 88/54*** | (2006.01) |
| ***F04B 17/00*** | (2006.01) |
| ***F04B 35/00*** | (2006.01) |
| ***F04B 23/04*** | (2006.01) |
| ***B67D 1/10*** | (2006.01) |
| ***B67D 1/00*** | (2006.01) |

(52) U.S. Cl.

CPC .............. *B67D 1/0078* (2013.01); *B67D 1/102* (2013.01)

USPC ........... 222/409; 417/338; 417/360; 417/529; 222/275; 222/326; 222/386

(58) Field of Classification Search

CPC .............................. B67D 1/0078; B67D 1/102

USPC ......... 222/252, 255, 386, 275, 278, 326–327, 222/409; 417/338, 360, 529, 571

See application file for complete search history.

(56) References Cited

U.S. PATENT DOCUMENTS 3,727,799 A 4/1973 Nixon
3,739,947 A * 6/1973 Baumann et al. ............. 222/136

(Continued)

FOREIGN PATENT DOCUMENTS

GB 2 416 757 A 2/2006
WO WO2006/097724 A2 9/2006

*Primary Examiner* — Kevin P Shaver
*Assistant Examiner* — Matthew Lembo
(74) *Attorney, Agent, or Firm* — Andrus Intellectual Property Law, LLP

(57) ABSTRACT

A pump driver, a disposable pump cartridge for use with the pump driver and a beverage dispenser employing the pump drive are disclosed. The disposable pump cartridge comprises at least one barrel 20 having an inlet valve 24 and an outlet valve 26 associated therewith. A piston 28 movable within the barrel 20 is retained in a minimum volume position during transit by a protrusion 22 on the internal surface of the barrel 20. The piston 20 has a piston shaft 28 with a hollow end arranged, in use, to releasably engage a piston driver to drive the piston 28 from its minimum volume position to an operative position, and to reciprocate the piston 28 within the barrel 20 in its operative position to draw fluid into and pump fluid from the barrel 20 via the inlet valve 24 and outlet valve 26 respectively. Methods of engaging, disengaging and changing the disposable pump cartridge are also disclosed.

7 Claims, 15 Drawing Sheets

(56) References Cited

U.S. PATENT DOCUMENTS

| | | | | |
|---|---|---|---|---|
| 4,834,717 | A * | 5/1989 | Haber et al. | 604/193 |
| 6,196,999 | B1 * | 3/2001 | Goethel et al. | 604/131 |
| 6,923,006 | B2 * | 8/2005 | Walton et al. | 62/3.64 |
| 7,066,360 | B2 * | 6/2006 | Hearld et al. | 222/525 |
| 7,331,483 | B2 * | 2/2008 | Bhimani et al. | 222/1 |
| 7,337,538 | B2 * | 3/2008 | Moutafis et al. | 29/888.02 |
| 7,458,962 | B2 * | 12/2008 | McWethy et al. | 604/506 |
| 7,472,805 | B2 * | 1/2009 | Nighy | 222/129.1 |
| 7,798,377 | B2 * | 9/2010 | Imhof et al. | 222/386 |

* cited by examiner

PISTON PUMP AND DRIVER THEREFOR

FIELD OF THE INVENTION

The present invention relates to pumps, in particular the present invention relates to disposable pump cartridges and drive systems therefore.

BACKGROUND OF THE INVENTION

In many applications where fluid is to be pumped it is desirable to use a disposable pump, for example in areas like the food and beverage industry or the medical sector where hygiene or sterility are important considerations. The most cost effective way to effect a disposable pump is to have a cheap disposable pump cartridge containing the pumping element and which contacts the fluid being pumped, and a non disposable pump driver that drives the pump cartridge.

Such pumps are commonly either peristaltic or pneumatically driven. Peristaltic pumps are quite effective but have limitations when it comes to pumping high viscosity fluids, such as beverage concentrates. Pneumatically driven pumps usually have a complex control system associated with them and rely of good sealing when the user initially puts the pump cartridge in the machine In using such pumps the user must insert the disposable pump cartridge into the machine and ensure that it is properly engaged by the machine. This requires some level of skill from the user and is a potential area for failures to occur. In particular it is necessary to achieve a good seal between the pump and the machine for the pneumatic drive to function leak free.

Furthermore the disposable pump cartridges may be transported already attached to a reservoir of fluid. In this case it is important that should the pump and reservoir be dropped etc. during transport that none of the content of the reservoir should bleed out through the pump cartridge as a result of the hydrostatic pressures resulting from transportation.

The pump of the present invention may be used with a beverage dispenser as disclosed in International Application No. PCT/GB2008/000079 having an International Filing Date of Jan. 9, 2008, and for which a continuation-in-part U.S. National Stage application was filed as Serial No. on even date herewith, which PCT and continuation-in-part U.S. National Stage application are hereby incorporated by reference as though fully set forth herein.

OBJECT OF THE INVENTION

It is the purpose of the present invention to provide an improved simple to use disposable pump,

SUMMARY OF THE INVENTION

According to a first aspect of the present invention there is provided:

a pump driver for driving a disposable pump cartridge comprising at least one barrel, having an inlet valve and an outlet valve associated therewith, and a piston, having a piston shaft, movable within said barrel to change the enclosed volume of the barrel between a minimum and a maximum volume to draw fluid into and pump fluid from said barrel via said inlet valve and outlet valve respectively, and a retention means to retain the piston in its minimum volume position during transit, wherein:

the pump driver is arranged to, in use, releasably engage with the piston shaft;

to drive the piston from its retained position to an operative position; and to reciprocate the piston within the barrel in its operative position to draw fluid into and pump fluid from the barrel.

Preferably the pump driver is also operative to return the piston to its retained position and to disengage the drive mechanism from the piston shaft.

In one preferred arrangement the pump cartridge comprises a single barrel.

In an alternative preferred arrangement the pump cartridge comprises a pair of barrels, each having a piston and a retention means associated therewith.

When the piston is in its retained position it prevents through flow of fluid through the pump, preferably it maintains the inlet valve in a closed position.

In a first preferred arrangement the retention means comprises a protrusion on the inner surface of the barrel past which the piston must move and to move into its operative position from its retained position. In a second preferred arrangement the retention means may comprise a groove on the piston which interacts with one or more protrusions on the inner surface of the barrel when said piston is in its retained position, or a groove on the inner surface of the barrel which interacts with one or more protrusions on the piston when said piston is in its retained position. In a third preferred arrangement the retention means comprises a protrusion from the closed end face of the barrel which, when the piston is in its retained position engages in a corresponding indentation in the end of the piston, the indentation being so shaped as to grip the protrusion thereby retaining it. Preferably the barrel and/or pump are plastics mouldings and the protrusion is integral to that moulding.

Preferably the force applied by the pump driver is sufficient to move the piston past the protrusion so as to move it from its retained position to its active position and vice versa. In a preferred arrangement the piston and/or the barrel temporarily deform as the piston is moved over the protrusion.

Preferably the pump driver comprises a reciprocable drive shaft having engagement means at one end thereof for engaging with a piston shaft.

In a first preferred embodiment each engagement means comprises a first section, axially aligned with the drive shaft, insertable into a hollow end of the piston shaft, the maximum diameter of the first section being larger than the inner diameter of the end of the piston shaft such that, as the first section is inserted into the end of the piston shaft, the end of the piston shaft deforms outwardly enabling the larger diameter of the first section to pass the smaller diameter of the end of the piston shaft, after which the outer end of the piston shaft substantially returns to its un-deformed position thereby engaging said drive shaft with said piston shaft. In one preferred arrangement this is achieved by using a flexible material for the piston shaft which recovers elastically after being outwardly deformed to allow the first section to pass into it. In an alternative arrangement a spring means, such as a spring clip encircling the end of the piston shaft, is provided such that the spring means substantially returns the piston shaft to its un-deformed position.

Preferably the first section has a chamfered or radiused leading edge such that when inserted into the end of the piston shaft the piston shaft will be outwardly deformed by it. Preferably the first section is substantially symmetrical in shape and is smaller at its outermost end, for example a triangle, a triangle with curved sides, an isosceles trapezium, or any of these shapes rotated through its axis to form a cone, curved cone or truncated cone.

Preferably the hollow end of each piston shaft has longitudinal slots therein to facilitate its outward deformation.

In a second preferred embodiment the ends of the piston shaft are hinged such that they can be pivoted outwards to allow the first section to pass into the end of the piston shaft and are sprung back into their original position one the first section is within the end of the piston shaft.

Preferably, in either of the above embodiments, the engagement means further comprises a second section adjacent and axially aligned with the first section, between the first section and the drive shaft. Once the first section is engaged the drive shaft is withdrawn, bringing the piston with it and moving the piston from its retained position and, when the drive shaft is fully withdrawn it is driven forwards and, as it is driven forwards, friction between the piston and the barrel and/or the retention means, the fluid force in the barrel, or a combination of both prevents the piston being pushed forwards past the retention means such that the engagement means is pushed further into the end of the piston shaft and as the second section is inserted into the end of the piston shaft, the end of the piston shaft again deforms outwardly enabling the larger diameter of the second section to pass the smaller diameter of the end of the piston shaft, after which the outer end of the piston shaft substantially returns to its un-deformed position thereby engaging said drive shaft with said piston shaft in a second position. Once engaged in its second position, the piston reciprocates with the drive shaft in its operational position.

Preferably, when in the second engaged position, the end of the first section closest the piston abuts the piston shaft when driving forwards According to a third preferred arrangement the piston shaft has a substantially non deformable end having a cavity therein and the drive shaft is provided with retractable engagement means such that, in their retracted position the driveshaft and engagement means can pass into the end of the piston shaft, and, once inserted into the end of the piston shaft assume their non retracted position whereby the piston shaft becomes engaged by the drive shaft. Preferably the motion of passing the end of the drive shaft into the end of the piston shaft causes the engagement means to become retracted and preferably once within the end of the piston shaft spring means cause the engagement means to assume their non retracted state. Preferably the drive shaft is provided with a mechanical drive means for retracting the engagement means to allow the piston shaft to be disengaged.

Preferably the pump cartridge comprises a pair of barrels and the pump driver comprises a pair of drive shafts arranged for reciprocating motion and each having engagement means as described above. Preferably the drive shafts are driven by a cam mechanism and preferably the cam mechanism for both drive shafts is driven by a single motor.

Preferably the cam mechanisms comprise a single two faced cam, each drive shaft being driven off a different face of the cam. Preferably the cam mechanisms comprise two tracks, in each of which a cam follower runs, positioned on opposite sides of a rotating disc. The disc need not be circular in shape but may be any shape, for example it could have the same shape as the cam tracks.

Preferably the pump driver further comprises a disengagement means to disengage the piston shaft from the engagement means.

Preferably, for the first and second preferred embodiments the piston shaft tapers or curves radially inward from its end to its inner diameter and the disengagement means comprises a means, introduced into the hollow end of the piston shaft, from the direction of the drive shaft and between the piston shaft and the engagement means, to deform the end of the piston shaft radially outwards and forwards, releasing it from, and optionally moving it out of engagement with, the first and/or second section. Preferably, moving the piston shaft out of engagement with the first and/or second section moves the piston back into its retained position.

Preferably the disengagement means comprises a sleeve surrounding the drive shaft, more preferably the disengagement means has a tapered end such that when inserted into the end of the piston shaft the tapered face of the disengagement means comes into sliding contact with the tapered or radiused face of the end of the piston shaft.

In one preferred arrangement the disengagement means is driven towards the piston shaft so as to be inserted into its hollow end by a disengagement cam. Where two drive shafts are driven by a single motor, the disengagement cam is preferably driven by the same single motor.

In an alternative arrangement the disengagement means is driven towards the piston shaft so as to be inserted into its hollow end by a rack and pinion system, the pinion being driven by a motor and the rack being attached to the disengagement means. More preferably the motor is one and the same motor as used to drive the drive shaft.

In another preferred embodiment during disengagement the disengagement means is stationary and the drive shafts draw the piston shaft onto the disengagement means, although it will be appreciated that in this embodiment the pistons may not be returned to their retained position on disengagement.

Preferably, when the motor is driven in a first direction the drive shafts are reciprocated and when the motor is driven in a second direction the disengagement means is driven to disengage the piston shafts. Preferably the disengagement means is driven by a sprag clutch.

According to a second aspect of the present invention there is provided a disposable pump cartridge for use with the pump driver according to claim 1 comprising:

- at least one pump barrel having a piston therein, said piston having means for connection to a drive means for driving said piston of the disposable pump cartridge;
- a fluid inlet for connection to a source of fluid to be pumped, said fluid inlet leading to at least one inlet valve leading into the barrel;
- at least one outlet valve leading from said barrel to a pump outlet; and
- a retention means arranged to retain the piston in a position adjacent the inlet and outlet valves during transit.

In a first preferred arrangement the retention means comprises a groove on the piston which interacts with one or more protrusions on the inner surface of the barrel when said piston is in its retained position.

In a second preferred arrangement the retention means comprises one or more protrusions on the barrel and when the piston is in its retained position it is in a position between the protrusions and the inlet and outlet valves.

In a third preferred arrangement the retention means comprises a groove on the inner surface of the barrel which interacts with one or more protrusions on the piston when said piston is in its retained position In a fourth preferred arrangement the retention means comprises a protrusion on the end face of the barrel containing the inlet and outlet valves and which interfaces with a recess in the face of the piston.

Preferably the barrel and piston are plastics mouldings and the protrusion is integral to either the barrel or piston moulding.

Preferably the disposable pump cartridge also comprises a second fluid inlet downstream of the outlet valve and upstream of the pump outlet to which a supply of a second fluid is provided such that, in use, a mixture of the fluid being pumped and the second fluid exits from the pump outlet.

Preferably between the second fluid inlet and the pump outlet is a mixing element to mix the pumped fluid and the second fluid. Preferably the mixing element comprises a static mixer.

Preferably between the second fluid inlet and the pump outlet is a section of flexible conduit. Preferably the flexible conduit terminates in a nozzle. Preferably said nozzle comprises a means of preventing fluid dripping therefrom under gravity, for example a duck bill valve or similar. Preferably the disposable pump cartridge comprises a mixing element and said flexible conduit is located down stream of said mixing element.

In one preferred arrangement the disposable pump cartridge has one pump barrel. In an alternative preferred arrangement the disposable pump cartridge has two pump barrels.

According to a third aspect of the invention there is provided a pump comprising:

a pump driver according to the first aspect of the invention and a pump cartridge according to the second aspect of the invention.

According to a forth aspect of the invention there is provided a beverage dispenser for dispensing a beverage, said beverage dispenser having a pump drive according to the first aspect of the invention.

Preferably the beverage dispenser has a plurality of drive mechanisms to drive a number of pump cartridges. Preferably each pump cartridge has associated therewith its own reservoir of beverage concentrate. Preferably the reservoirs of beverage concentrate are of different flavours such that the dispenser is capable of dispensing a number of different flavoured beverages.

In a preferred arrangement the beverage dispenser is arranged for producing a diluted beverage wherein said dispenser comprises a supply of concentrate connected to the pump, a supply of diluent and a control system for controlling the speed of reciprocation of the drive shafts in response to a measured flow rate of diluent to dispense a beverage having a specific concentrate:diluent ratio. Alternatively the dispenser comprises a supply of concentrate connected to the pump, a supply of diluent, a diluent flow control valve, and a control system for controlling the flow of diluent in response to the speed of reciprocation of the drive shafts to dispense a beverage having a specific concentrate:diluent ratio.

In an alternative control method the motor speed is based on a predicted water flow. Preferably the water flow is predicted by using a supply of a known pressure and a flow orifice through which the water passes. Alternatively the pressure could be measured upstream of the flow orifice and the flow predicted from the pressure and the characteristics of the flow orifice.

According to a fifth aspect of the invention there is provided a beverage dispenser according to the forth aspect of the invention in combination with the pump cartridge according to the second aspect of the invention.

Preferably the beverage dispenser has a plurality of pump drivers for pumping a number for different flavoured concentrates and preferably each of the disposable pump cartridges have a flexible conduit attached thereto. More preferably the dispenser has a fixed dispense point from which the different flavoured beverages can be dispensed. The flexible conduits attached to the disposable pump cartridges lead from each of the pumps to the single point of dispense.

According to a sixth aspect of the invention there is provided a method of engaging a disposable pump cartridge, comprising at least one barrel having an inlet valve and an outlet valve associated therewith and a piston, movable within the barrel to change the enclosed volume of the barrel between a minimum and a maximum volume to draw fluid into, and pump fluid from, said barrel via said inlet valve and outlet valve respectively, with a drive mechanism arranged to releasably engage with and drive the piston of the cartridge from its retained position to an operative position and to reciprocate the piston within the barrel in its operative position to draw fluid into and pump fluid from the barrel, and priming said pump cartridge, said method comprising the steps of:

a) arranging a fluid receptacle at the outlet of the disposable pump cartridge;

b) coupling the drive mechanism to the pump cartridge;

c) drawing fluid into the pump cartridge to substantially fill the cavities therein;

d) pumping fluid through the pump cartridge to substantially eliminate any air or other gasses from any the cavities therein;

e) collecting any fluids expelled from the disposable pump cartridge in said receptacle; and f) disposing of said receptacle.

Preferably the receptacle comprises a flexible pouch. More preferably the flexible pouch has a means of sealing it to retain any fluid therein for disposal.

Preferably the disposable pump cartridge has a second fluid inlet downstream of the outlet valves and the method further comprises the step of, simultaneously to operating the drive mechanism to pump fluid through the pump cartridge to substantially eliminate any air or other gasses from any the cavities therein, adding a second fluid via the second fluid inlet into the pump cartridge such that the downstream of the pump outlet valves, the cartridge becomes primed with a mixture of the pumped fluid and the second fluid.

Preferably sufficient mixture of pumped fluid and second fluid will pass through the disposable pump cartridge and into the receptacle such that the pump cartridge is primed with a substantially homogeneous mixture of pumped fluid and second fluid at the correct pumped fluid: second fluid ratio.

According to a seventh aspect of the invention there is provided a method of disengaging a disposable pump cartridge, comprising at least one barrel having an inlet valve and an outlet valve associated therewith and a piston, movable within the barrel to change the enclosed volume of the barrel between a minimum and a maximum volume to draw fluid into, and pump fluid from, said barrel via said inlet valve and outlet valve respectively, from a drive mechanism arranged to releasably engage with and drive the piston of the cartridge from its retained position to an operative position and to reciprocate the piston within the barrel in its operative position to draw fluid into and pump fluid from the barrel, said method comprising the steps of:

a) arranging a fluid receptacle at the outlet of the disposable pump cartridge;

b) returning each piston to its position wherein the enclosed volume of the barrel is substantially at its minimum thereby substantially ejecting any fluid contained within the barrel into the fluid receptacle to substantially empty said pump barrel;

c) de-coupling the drive mechanism from the disposable pump cartridge;

d) removing the substantially empty disposable pump cartridge from the drive mechanism.

Preferably the receptacle comprises a flexible pouch. More preferably the flexible pouch has a means of sealing it to retain any fluid therein for disposal. Preferably the disposable pump cartridge has a second fluid inlet downstream of the outlet valves and the method further comprises the step of, once both pistons are returned to the position wherein the enclosed volume of the barrels is substantially at its minimum, passing the second fluid through the pump cartridge to substantially flush the pumped fluid from the cartridge downstream of the barrel outlet valves and into the receptacle prior to removing the pump cartridge form the drive mechanism.

In this manner any residual fluid in the pump cartridge downstream of said second fluid inlet in the second fluid which may advantageously be water. In this method where water is left in the pump cartridge any drips etc emitting form said pump cartridge are a substantially clean inert fluid.

According to an eighth aspect of the invention there is provided a method of changing a disposable pump cartridge, comprising at least one barrel having an inlet valve and an outlet valve associated therewith and a piston, movable within the barrel to change the enclosed volume of the barrel between a minimum and a maximum volume to draw fluid into, and pump fluid from, said barrel via said inlet valve and outlet valve respectively, engaged with a drive mechanism arranged to releasably engage with and drive the piston of the cartridge from its retained position to an operative position and to reciprocate the piston within the barrel in its operative position to draw fluid into and pump fluid from the barrel, said method comprising the steps of:

a) arranging a fluid receptacle at the outlet point of a first disposable pump cartridge;

b) returning each piston to its position wherein the enclosed volume of the barrel is substantially at its minimum thereby ejecting any fluid contained within the enclosed volume into the fluid receptacle to substantially empty said first disposable pump cartridge;

c) de-coupling the drive mechanism from the first disposable pump cartridge;

d) removing the substantially empty first disposable pump cartridge from the drive mechanism.

e) inserting a second disposable pump cartridge into the drive mechanism;

f) coupling the drive mechanism to the pump cartridge;

g) operating the drive mechanism to draw fluid into the pump cartridge to substantially fill the cavities therein;

h) operating the drive mechanism to pump fluid through the pump cartridge to substantially eliminate any air or other gasses from any the cavities therein;

i) collecting any fluids expelled from the disposable pump cartridge in said receptacle; and j) removing and disposing of said receptacle.

Preferably the receptacle comprises a flexible pouch. More preferably the flexible pouch has a means of sealing it to retain any fluid therein for disposal.

Preferably the disposable pump cartridge has a second fluid inlet downstream of the outlet valves and the method further comprises the step of, once both pistons are returned to the position wherein the enclosed volume of the barrels is substantially at its minimum, passing diluent through the pump cartridge via the second fluid inlet to substantially flush the pumped fluid from the cartridge downstream of the barrel outlet valves and into the receptacle prior to removing the pump cartridge form the drive mechanism. More preferably the method further comprises the step of, simultaneously to operating the drive mechanism to pump fluid through the pump cartridge to substantially eliminate any air or other gasses from any the cavities therein, adding diluent into the pump cartridge via the second fluid inlet such that the downstream of the pump outlet valves, the cartridge becomes primed with a diluted mixture of the pumped fluid and the diluent.

Preferably sufficient mixture of pumped fluid and diluent will pass through the disposable pump cartridge and into the receptacle such that the pump cartridge is primed with a substantially homogeneous mixture of diluent and fluid which is preferably at the required dilution ratio.

BRIEF DESCRIPTION OF THE DRAWINGS

Embodiments of the invention will now be described in detail, by way of example, with reference to the following drawings in which.

DETAILED DESCRIPTION

Figure 1:
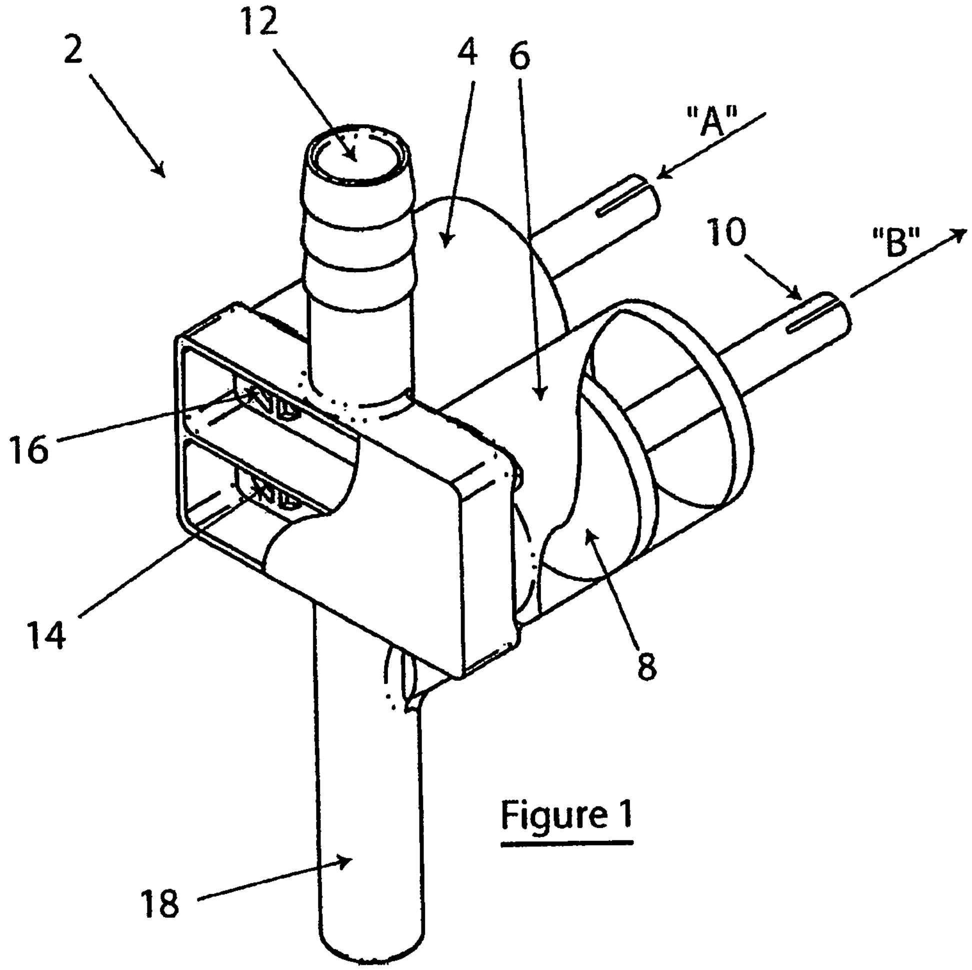
FIG. 1 is a perspective view of a pump cartridge suitable for use in the invention.

Referring to FIG. 1 a partially cut away view of a disposable pump cartridge 2 suitable for use in the invention is shown. The pump cartridge comprises two barrels 4, 6 in each of which a piston 8 is arranged for reciprocating movement. The piston 8 is connected to a piston shaft 10 for attachment to a driver (not shown). As the piston is moved in the barrel in direction "B" fluid is drawn into the barrel from fluid inlet 12 via an inlet valve 14 which is a simple flap valve, and as the piston 8 is moved in direction "A" the fluid in the barrel is ejected through outlet valve 16 and exits the pump at pump outlet 18.

Figure 2:
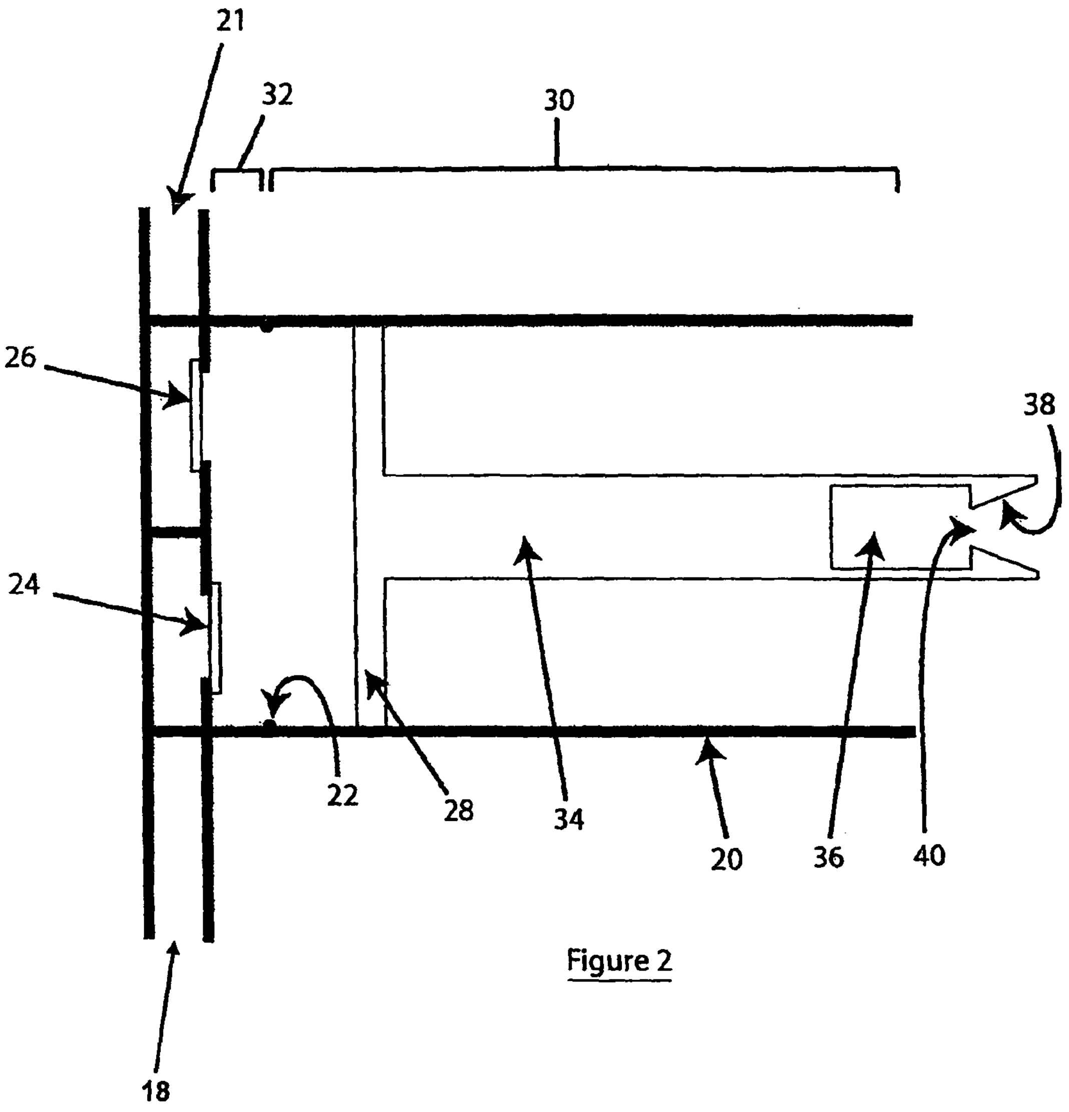
FIG. 2 is a section view through one of the barrels of the cartridge shown in FIG. 1.

Referring to FIG. 2 a cross section through one of the barrels of FIG. 1 is shown. In use the fluid inlet 21 is connected to a reservoir of fluid (not shown). The barrel has a protrusion 22 on its inner diameter towards the end housing the inlet valve 24 and outlet valve 26. The piston 28 is movable within the barrel 20 between its operative position 30 and its retained position 32, past the protrusion 22. When in its retained position 32 a sufficiently high force is required to move the piston 28 from its retained position 32 to its operative position 30 that it will not easily move out of its retained position 32 as a result of hydrostatic pressures acting on it created by the fluid in the reservoir during transit, for example if it were dropped. The piston 28 has a piston shaft 34 having a hollow end 36 having a tapered inlet 38, said inlet 38 decreasing in cross section to a minimum cross section 40 and thereafter increasing in cross section into the hollow end 36. The hollow end 36 of the piston shaft 34 has a plurality of axial slots therein (not shown) enabling the end of the piston shaft 34 to be outwardly deformed. The piston shaft 34 is made of polyethylene or polypropylene and so is able to flex and then return substantially to its original dimension. Other suitable materials will be apparent to those skilled in the art.

Figure 3A:
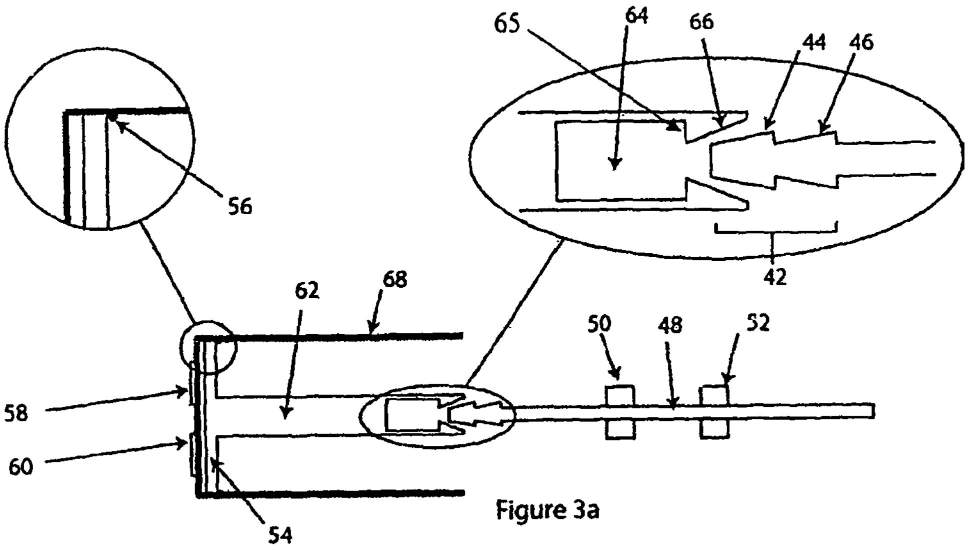
FIGS. 3*a-e* are cross sections showing the process of coupling the drive shaft and the piston shaft.
Figure 3B:
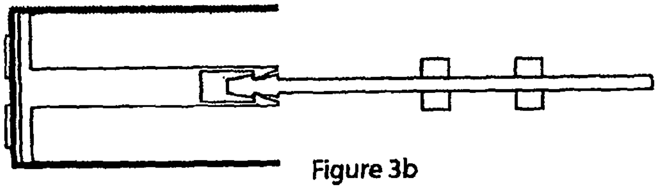
Figure 3C:
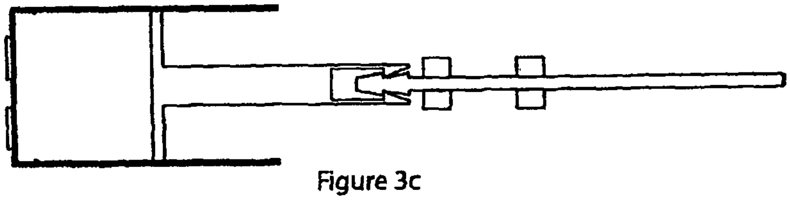
Figure 3D:
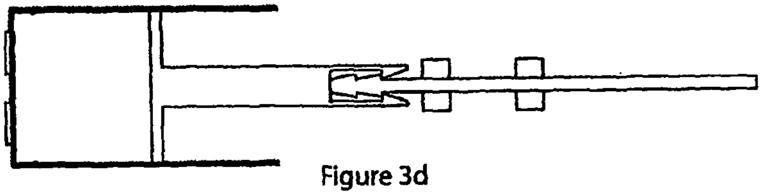
Figure 3E:
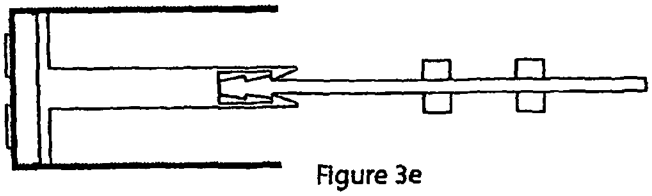

Referring to FIGS. 3*a*-3*e* the process of coupling a disposable cartridge with a drive mechanism is shown. The drive mechanism has an engagement means 42 which comprises a first 44 and second 46 truncated cone, aligned end on in their central axis, mounted on the end of a drive shaft 48 which can reciprocate in a pair of bushes 50, 52. In FIG. 3*a* the piston 54 is in its retained position between the protrusion 56 and the inlet 58 and outlet 60 valves. The engagement means 44 is adjacent, but not coupled to, the piston shaft 62 which has a hollow end 64 with a tapered entrance 66 as described above. Referring now to FIG. 3*b*, the piston shaft 48 is driven forwards by a drive mechanism described in detail with reference to FIG. 5 below. As it moves forwards, the tapered surface of the first cone 44 comes into contact with the tapered entrance 66 of the hollow end 64. As the piston can not be moved forward, as it abuts the front end of the barrel 68, the tapered surface of the first cone 44 deforms the end of the piston shaft 62 outwards and the first cone 44 passes into the hollow end 64. As it passes into the hollow end 64 the end of the piston shaft 62, which had been deformed outwards, substantially recovers its original shape engaging the first cone 44 in the hollow end 64. The drive mechanism then moves the piston shaft 48 from its retained position shown in FIG. 3*b* to its operational position shown in 3*c*, past the protrusion 56. The rear face of the first and second cones and the reverse drive face 65 of the hollow end are angled such that motion of the drive shaft 48 in the reverse direction causes the piston shaft 62 and piston 54 to be withdrawn and does not cause the end of the piston shaft 62 to once again deform outwardly preventing the first conical section 44 from pulling out of engagement with the end of the piston shaft 62. Once withdrawn fully in its operational position the drive shaft 48 is once again driven forward. The piston 54 is dimensioned such that the resistance to movement due to friction between the piston 54 and the barrel 68 is greater than the force needed to push the second cone 46 past the tapered entrance 66, deforming it outwardly, and into the hollow end 64. Once in the hollow end 64, the tapered entrance recovers substantially to its original dimensions thereby retaining the entire engagement means 42 in the hollow end 64 (FIG. 3*d*). The engagement means 42 is retained in such a position that when the drive means continues to move forwards the end of the engagement means 42 contacts and exerts a force on the inside surface of the hollow end 64 in the direction of movement of the drive means, the force imparted by the drive means being sufficient to overcome the friction between the piston 54 and the barrel 68 such that the piston 54 is driven forwards. The two cones of the engagement means 42, the piston 54 and the protrusion 56 are dimensioned such that the drive shaft 48 is fully extended in both FIGS. 3*b* and 3*e* and the distance between the two cones 44, 46 is sufficient to position the piston 54 on the retained side of the protrusion 56 when the piston shaft 62 is engaged with only the first cone 44 and on the operational side of the protrusion 56 when the piston shaft 62 is engaged with both cones 44, 46.

In operation a fluid receptacle, for example a flexible pouch, is presented to the pump cartridge outlet prior to the engagement of the drive means with the piston shaft. As the drive mechanism engages with the pistons and reciprocates them fluid is drawn into the pump barrels via the inlet valves at the bottom of the end face of the piston barrels and ejected via the outlet valves at the top of the pump barrel. In this manner any air trapped in the barrel will rise to the top of the barrel and be ejected via the outlet valve thereby priming the pump. Prior to use for dispensing a volumetric amount from the pump, the pistons are reciprocated sufficiently to substantially eliminate all the air from the pump barrels and valve areas. Any fluid that passes through the pump during this priming process is collected in the flexible pouch positioned at the pump outlet. Where the pump cartridge has a second fluid inlet downstream of the outlet valve then during the priming process a diluent fluid is supplied into the pump cartridge via the second fluid inlet to admix with the pumped fluid. Sufficient pumped fluid and diluent are passed through the pump cartridge in the priming process that any fluid retained in the cartridge downstream of the second fluid inlet is substantially at the required ratio of pumped fluid to diluent. Again any fluid passing through the pump cartridge to achieve this is collected in the flexible pouch. In this manner when the flexible pouch is removed and either emptied or sealed and disposed of, the pump is ready to pump the required fluid at the required ratio without the inclusion of any substantial amounts of air.

Referring to FIGS. 4*a*-4*e* the process of decoupling the disposable pump cartridge from the drive mechanism is shown.

Figure 4A:
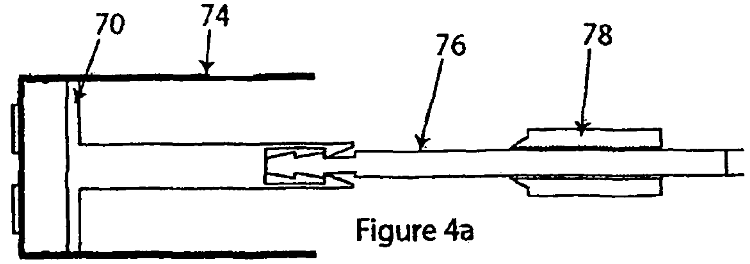
FIG. 4*a-e* are cross sections showing the process of decoupling the driveshaft and the piston shaft.
Figure 4B:
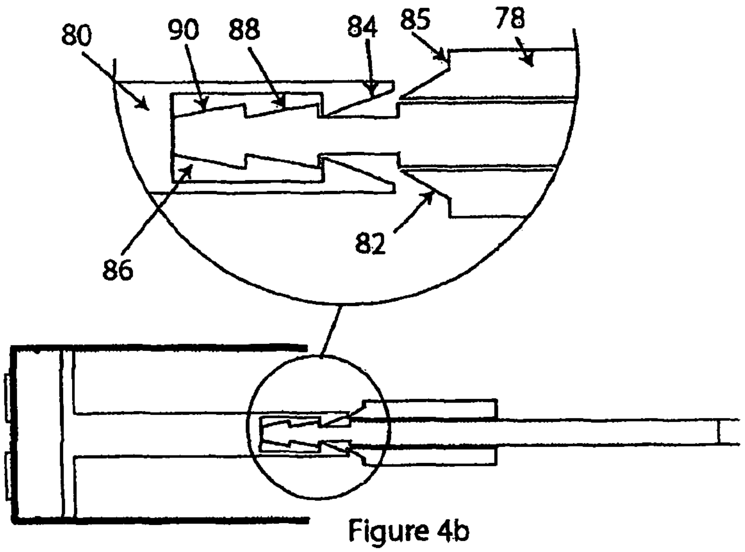
Figure 4C:
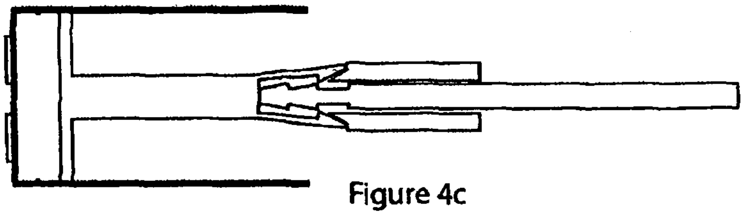
Figure 4D:
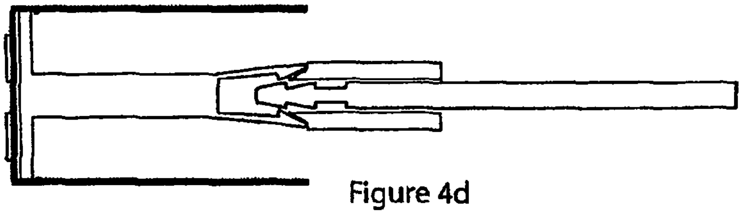
Figure 4E:
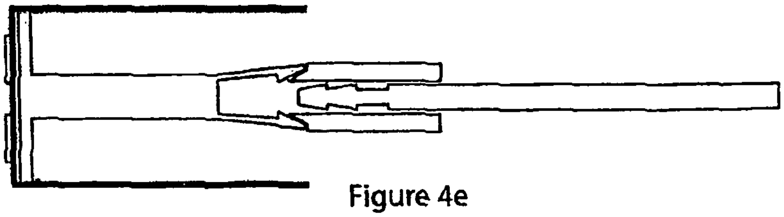

In FIG. 4*a* the piston 70 is shown in its position adjacent the protrusion (56, FIG. 3*a*) on the pump barrel 74. In this position the drive member 76 is in its fully extended position and the disengagement member 78 is in its retracted position. Referring now to FIG. 4*b*, the disengagement member 78 is moved in the direction of the piston to a position adjacent the end of the piston shaft 80. Upon further movement of the disengagement member 78 the tapered face 82 thereof contacts the tapered entrance 84 of the hollow end 86 of the piston shaft 80. As the disengagement member 78 contacts to tapered inlet 84, continued movement in the same direction deflects the end of the piston shaft 80 outwards, until it is moved out of engagement with the rear cone 88 of the drive member 76 (FIG. 4*c*) and the substantially perpendicular face 85 of the disengagement means abuts the end of the piston shaft 80. Continued movement of the disengagement means pushes the piston shaft forward moving the piston past the protrusion in the barrel of the pump (FIG. 4*d*). The drive member 76 can then optionally be withdrawn to a position in which both of the cones 88, 90 are moved out of engagement with the end of the piston shaft 80 (FIG. 4*e*), after which the disengagement means 78 can be withdrawn, leaving the piston 70 in its retained position and the pump cartridge can then be removed. Alternatively the pump cartridge may be removed with the drive member in the position shown in FIG. 4*d*.

In operation a fluid receptacle, for example a flexible pouch, is presented to the pump cartridge outlet prior to the disengagement of the drive means from the piston shaft. As the pistons are driven forward during the disengagement process an amount of fluid contained in the pump barrel will be driven out of the pump barrel and will be collected in the flexible pouch. Where the pump cartridge has a second fluid inlet downstream of the outlet valve then during the disengagement process, prior to removal of the pump cartridge from the pump drive a diluent fluid is pumped through the pump cartridge and into the flexible pouch to flush and of the pumped fluid from the pump cartridge. As the pumped fluid is typically a concentrate this process removes any concentrate from the pump cartridge leaving it containing diluent which, in case of drips is easier to clean. After the pump cartridge has been removed the flexible pouch may be removed and either emptied or sealed and disposed of. Alternatively if the removed pump is being replaced with a new pump, the flexible pouch may be left in position and the same flexible pouch used to collect any fluids passing through the new cartridge during the engagement and priming process as described above.

Figure 5:
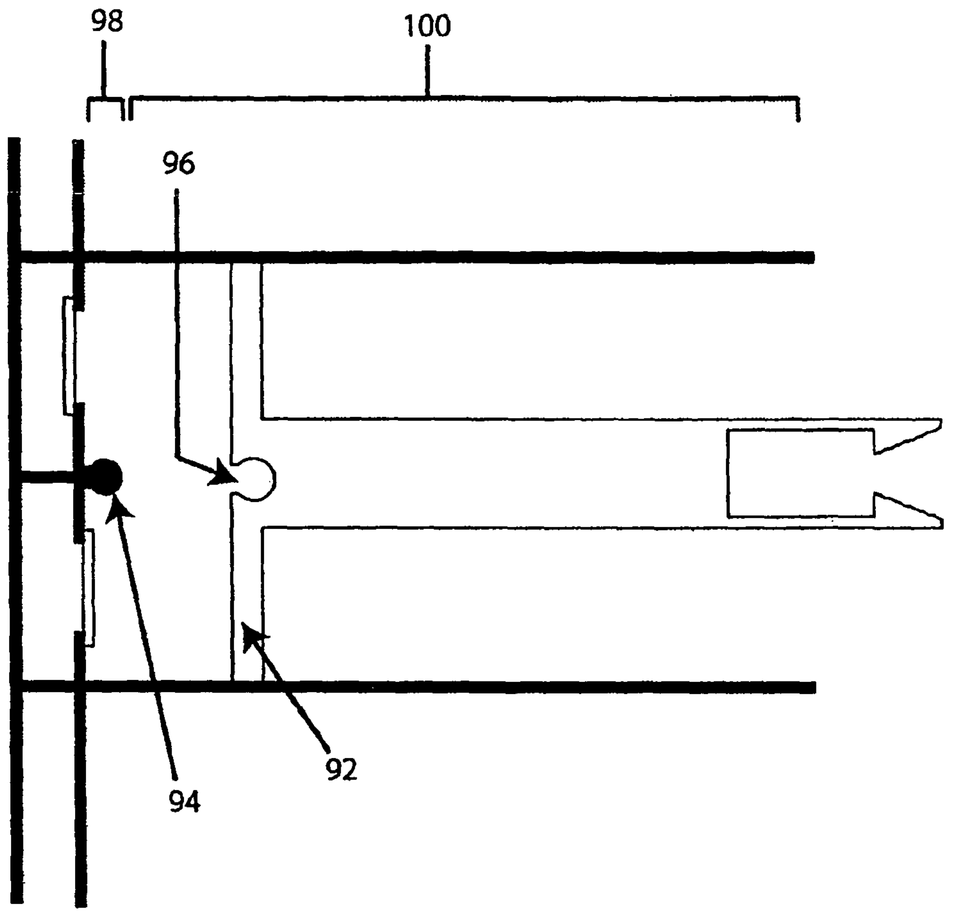
FIG. 5 is a cross-section of an alternative pump cartridge for use in the invention.

Referring to FIG. 5 an alternative arrangement of a pump suitable for use in the invention is shown. In this arrangement the piston 92 has a recess 96 centrally located on its face, the recess has a narrow mouth and then opens out into a small cavity. The body of the pump has a protrusion 94 which at its widest point is wider that the mouth of the recess 96 on the piston 92. in use, the piston can be pushed onto the protrusion such that the mouth of the recess deforms allowing the protrusion to enter into the cavity. The piston then substantially elastically recovers its shape around the protrusion retaining the piston in its retained position. The operation of the pump and the engagement and disengagement with the drive system is as described with reference to FIGS. 3*a-e* and 4*a-e*. This design is slightly advantageous in that the retained zone 98 is smaller and the operative zone 100 is bigger. The implications of this is that for the same sized pump more fluid can be pumped per stroke and the amount of fluid left in the dead space in the retained zone during normal operation is minimised.

Figure 6:
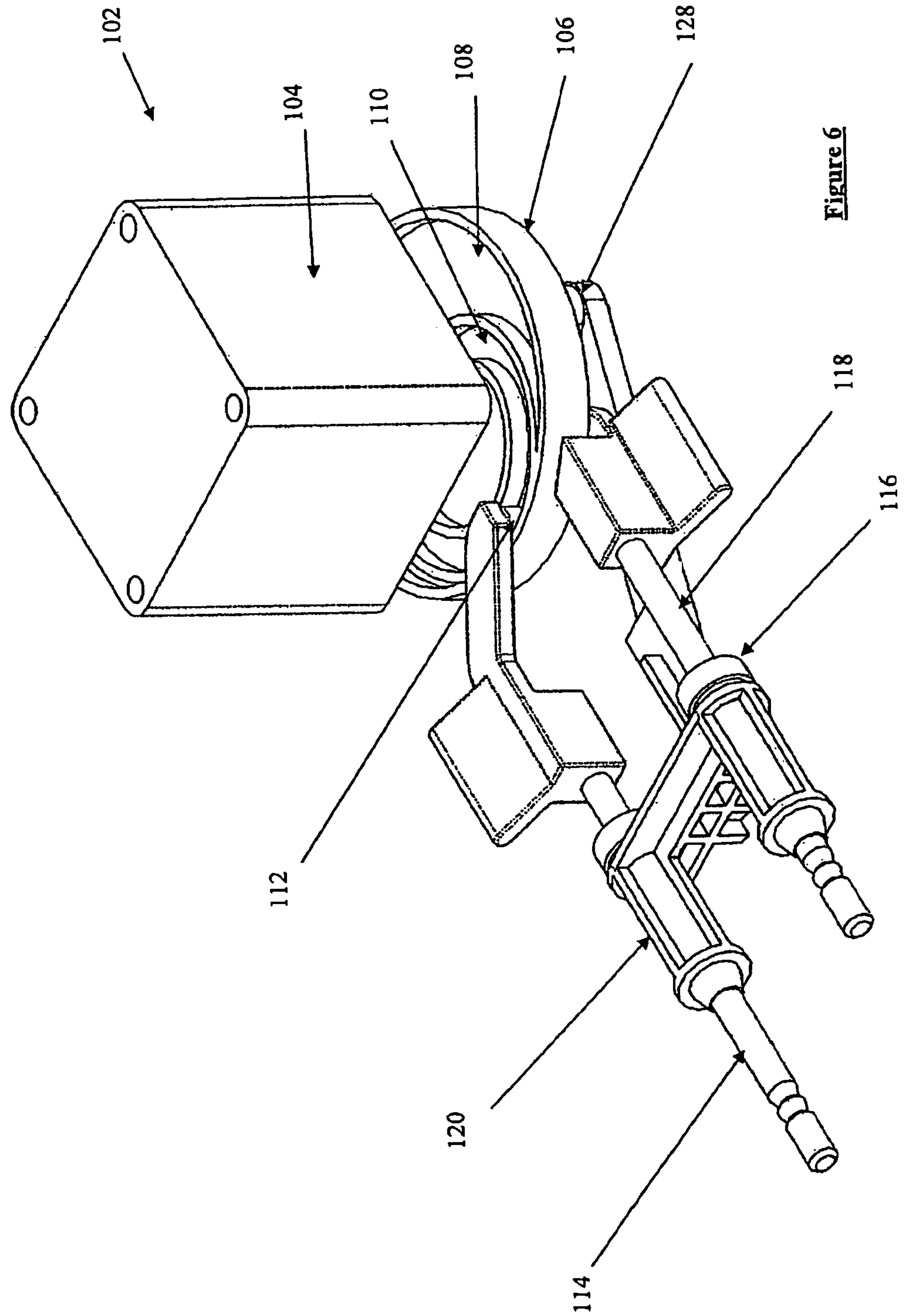
FIG. 6 is a perspective diagram of a drive mechanism of the invention.
Figure 7:
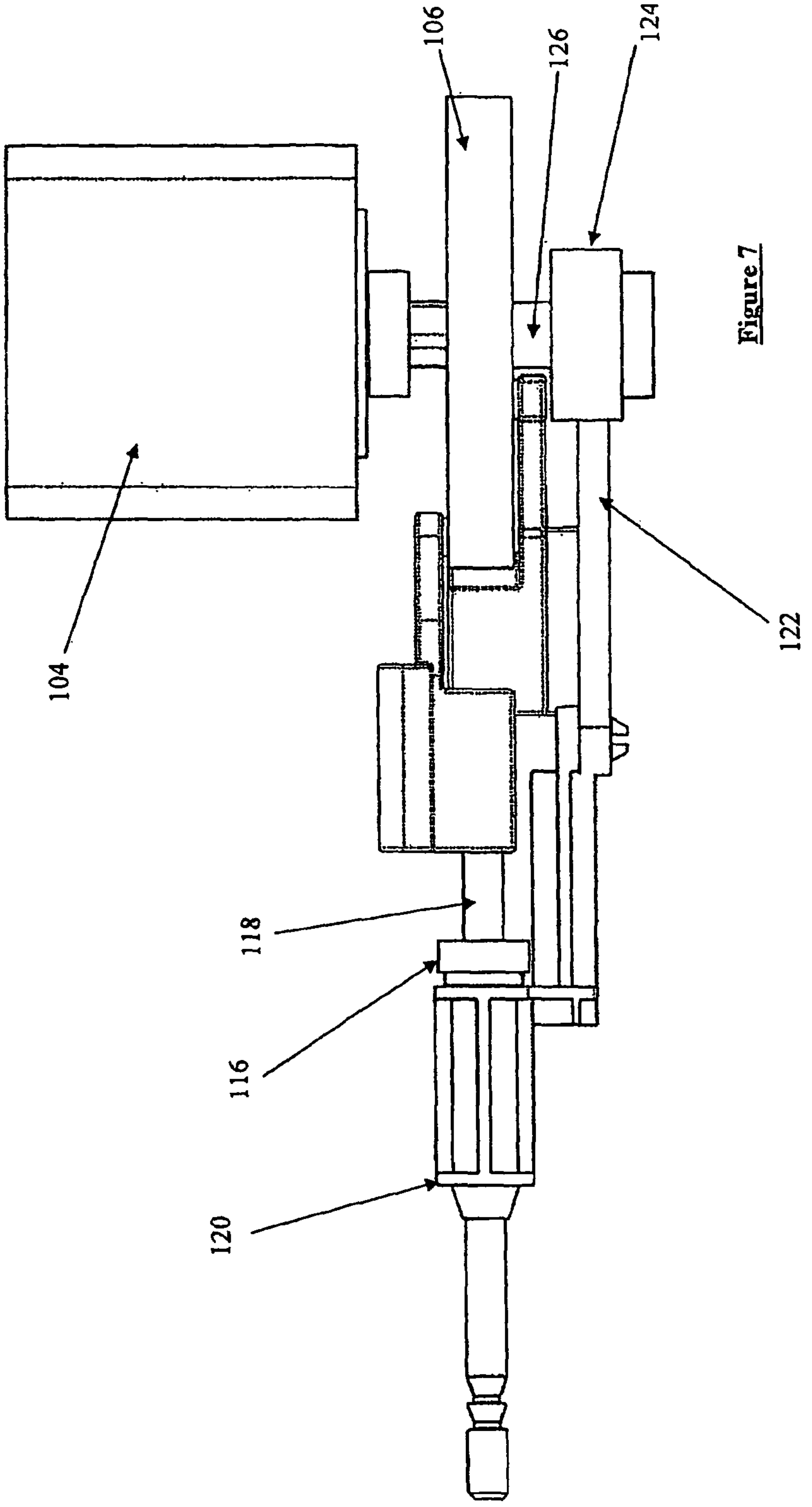
FIG. 7 is a side view of the drive mechanism of FIG. 6.

Referring to FIGS. 6 and 7 a drive mechanism 102 of the invention is shown. A motor 104 drives a two faced cam 106 which has a drive face on its upper surface 108 having a cam track 110 and a drive face (not shown) on its lower surface also having a cam track. A follower 112 runs in the cam track 108 and is attached to a drive shaft 114 which, in use, engages with a piston shaft of a disposable pump cartridge as described above. The drive shaft 114 runs through a bearing 116 such that rotational movement of the cam 106 is translated into reciprocal movement of the drive shaft 114. The cam track 108 is profiled such that the reciprocal movement of the drive shaft 114 is slower in the outward direction than it is in the return direction. The two drive shafts 114, 118 are simultaneously driven by the cam tracks 110 on opposite sides of the same cam 106 driven by the motor 104. The cam tracks 110 on the two faces of the cam 106 are dimensioned such that the reciprocal motion of the two drive shafts 114, 118 is out of phase with one another, however as the return motion is faster that the outward motion there will be an overlap period once per revolution of the cam whereby both the drive members 114, 118 are moving in the outward direction resulting in a substantially continuous output of fluid from a disposable pump cartridge being driven by the drive mechanism 102. The cam track is profiled to match the acceleration and deceleration of the two drive shafts such that a constant flow of fluid is pumped The drive mechanism 102 also has a disengagement member 120 connected by a disengagement connector 122 to a sprag clutch 124. During normal operation of the drive mechanism 102 the motor 104 rotates in a first direction to drive the drive members 114, 118. When rotating in the first direction the motor shaft 126 rotates freely within the sprag clutch 124 and the disengagement member 120 does not move. When the motor 104 is rotated in a second direction, opposite the first direction, the sprag clutch 124 engages with the motor shaft 126 which, by means of a disengagement cam 128 drives the disengagement member 120 forward to, in use, disengage the piston shaft from the drive shafts 114,118 of the drive mechanism 102 as described with reference to FIG. 4. The rotation of the cam 106 in the second direction continues to drive the drive shafts 114, 118 in reciprocal motion, withdrawing them once they have been disengaged from the piston shaft (not shown) by the disengagement member 120. The ends of the drive shafts 114, 118 are shaped with a profiled end to engage with the piston shaft (not shown) as described with reference to FIG. 3*a-e.*

Figure 8:
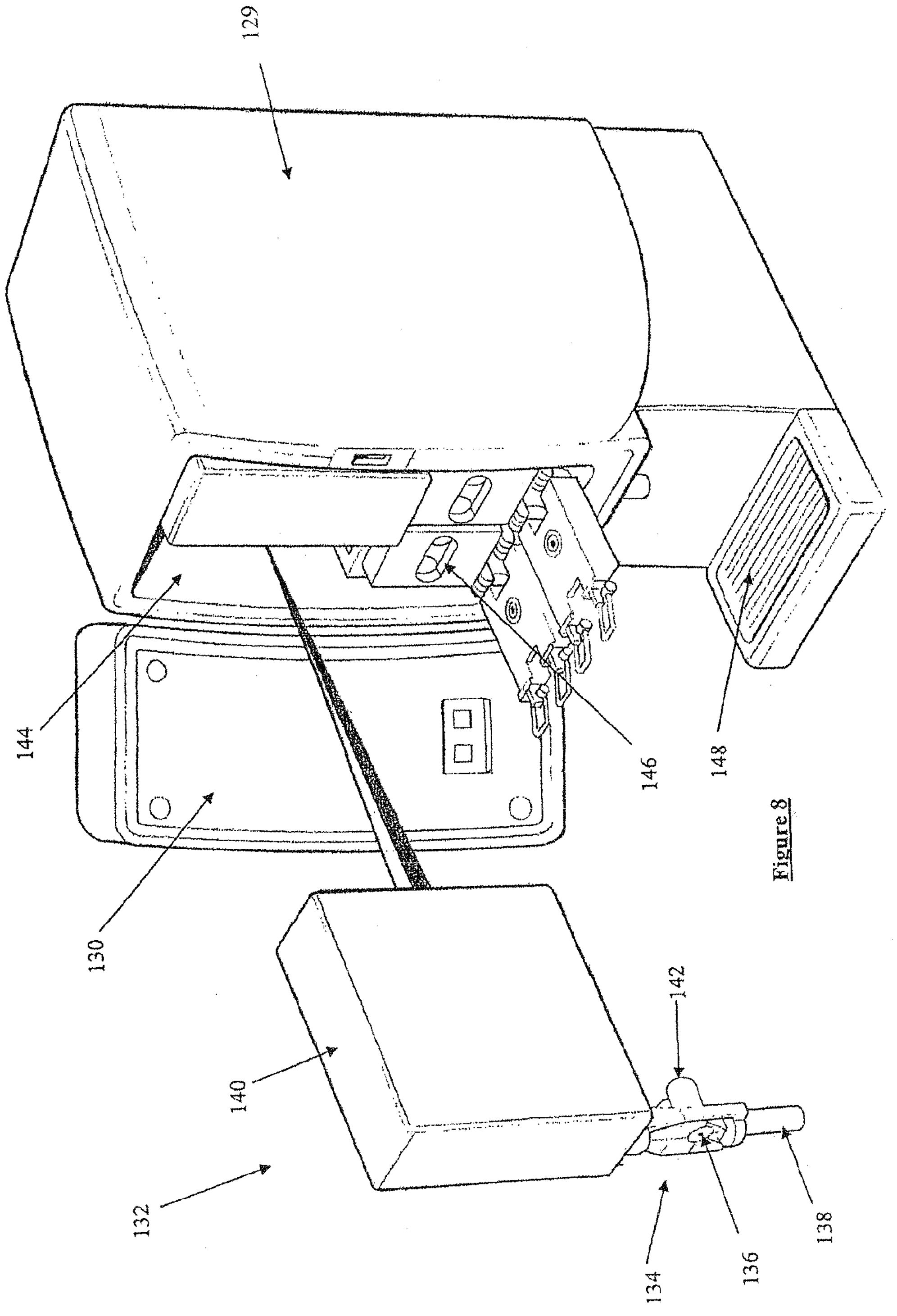
FIG. 8 is a diagram of a beverage dispenser using a pump according to the invention.

Referring to FIG. 8, a beverage dispenser 129 using the pump according to the invention is shown. The door 130 of the dispenser opens to allow the user to load and unload the concentrate unit 132. One the outside of the door is a user interface that allows the user to select to dispense a beverage. The concentrate unit 132 consists of a disposable flexible reservoir (not shown) connected to a disposable dual piston pump unit 134 which has a diluent inlet 136 and a static mix 138. The flexible reservoir is placed within a re-usable rigid container 140 which supports the flexible reservoir. The diluent enters the pump unit 134 downstream of the piston barrels 142, which pump the concentrate, and the pumped concentrate and the diluent then flow together to the static mixer 138, which uses turbulence and fluid shear as the admixture passes therethrough to produce a substantially homogeneous mixture.

The concentrate unit 132 including the disposable pump unit 134 are placed in the dispenser 128 such that both are within the refrigerated area 144 of the dispenser 128 and the pump unit 134 is positioned such that it interfaces with the pumping station 146, behind each of which is a drive mechanism as described with reference to FIGS. 6 and 7 above, of which two are situated within the dispenser 128. By maintaining both the pump unit and the reservoir in the refrigerated section any juice within the pistons 142 of the disposable pump unit 134 is maintained at its refrigerated temperature. The upper refrigerated cabinet area is cooled by means of a standard air blown refrigeration system as known in the art. The dispenser 128 has a drip tray 148 positioned below the point of dispense to retain any drips from the static mixers 138.

Figure 9:
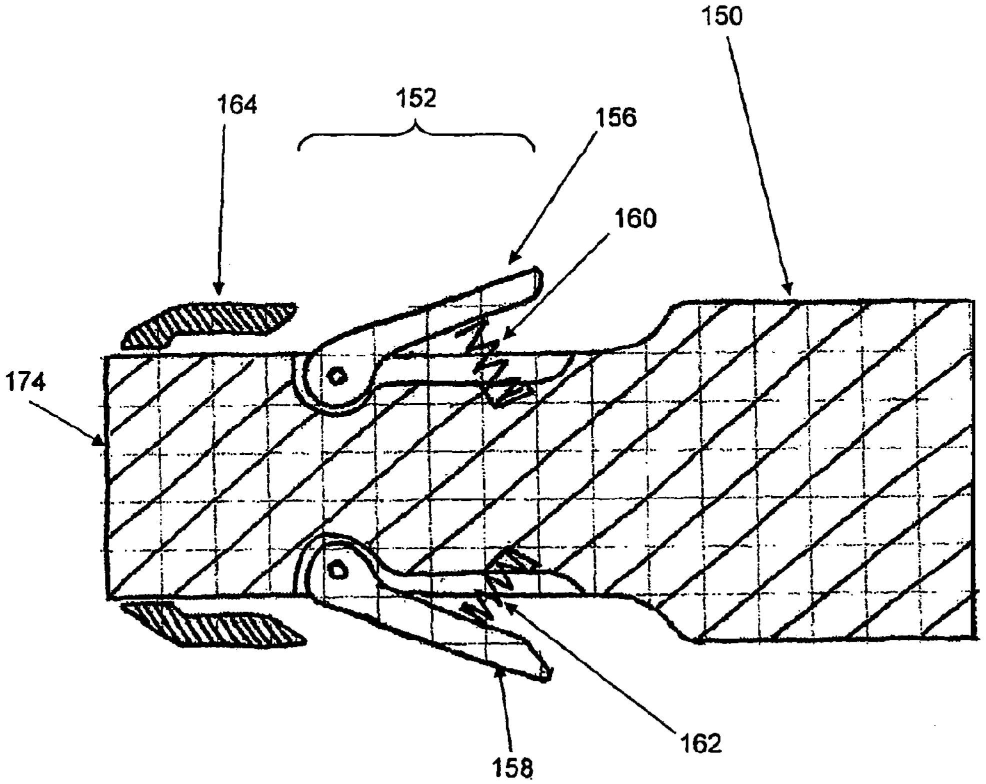
FIG. 9 is a section view through the end section of a drive shaft for use with the present invention.
Figure 10:
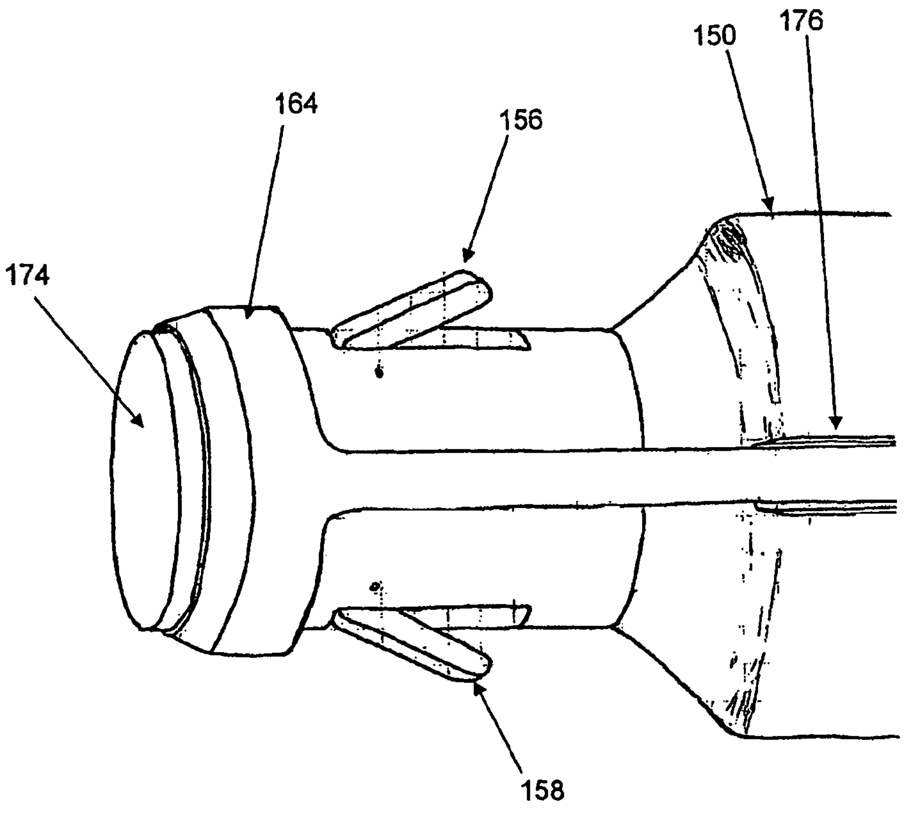
FIG. 10 is a perspective view of the drive shaft shown in FIG. 9.
Figure 11:
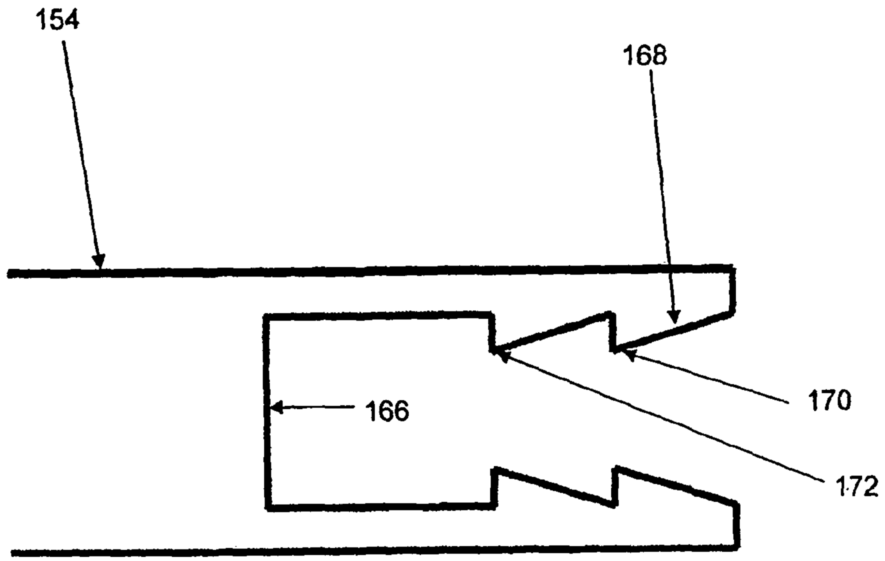
FIG. 11 is a section view of a piston shaft for use with the drive shaft shown in FIGS. 9 and 10.

Referring to FIGS. 9 to 11, an alternative arrangement of the invention is shown in which the end of the drive shaft 150 has an engagement means 152 thereon which engages with the end of the piston shaft 154 (shown in FIG. 11). The engagement means 152 comprises two outwardly sprung sprags 156, 158 which are movable between a retracted position (not shown) wherein the sprags are substantially parallel to the drive shaft 150 and an engaged position (shown) wherein they project angularly from the drive shaft 150. The sprags 156, 158 each have a spring 160, 162 associated therewith to bias them into their engaged position. A release member 164 encircles the end of the drive shaft and is linearly movable between a first (shown) position wherein it is clear of the sprags and a second position (not shown). The action of moving the member 164 from the first to the second position draws it over the sprags so as the move them from their engaged position to their disengaged position.

In use the end of the drive shaft 150 is inserted into the end of the piston shaft 154. As the drive shaft 150 enters the end of the piston shaft 154 the sprags 156, 158 are pushed inwards towards their disengaged position by surface 168 of the piston shaft. As the sprags pass the lip 170 they spring outwards and the piston shaft 154 can then be drawn in one direction by the drive shaft 150. Continued movement of the drive shaft 150 into the piston shaft 154 causes the sprags, as they pass by the second lip 172, to once again be moved towards their disengaged position. Again, once past the second lip 172 the sprags 156, 158 are sprung into their engaged position.

Further insertion of the drive shaft 150 causes the end 174 of the drive shaft to press against the internal end wall 166 of the piston shaft 154 thereby driving it is a first direction. Attempted retraction of the drive shaft 150 causes the sprags to engage behind the lip 172 of the piston shaft 154 thereby drawing the piston shaft with it. When it is desirable to disconnect the drive shaft 150 from the piston shaft 154, the release member 164 is operable to move the sprags 156, 158 from their engaged position into their disengaged position such that when in their disengaged position the drive shaft 150 can be withdrawn from the end of the piston shaft 154 past the lips 170, 172. The release member 164 is movable in a linear fashion along the length of the drive shaft 150. Guide slots 176 (shown in FIG. 10) are positioned in each side of the drive shaft 150 in which the release member 164 is guided.

Figure 12:
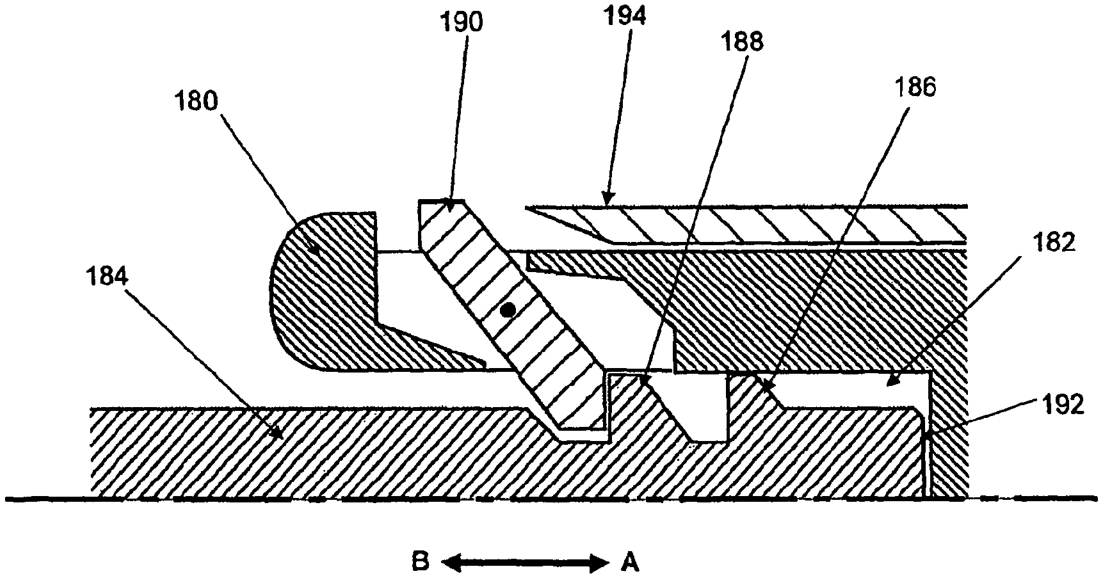
FIG. 12 is section view of a piston shaft/drive shaft according to the invention.

Referring to FIG. 12 another preferred arrangement of the piston engagement is shown. The end of the drive shaft 180 has a recess 182 therein adapted to receive the end of the piston shaft 184 of a disposable pump unit. The section of the piston shaft 184 that is received within the end of the drive shaft 180 has a profiled end comprising two protrusions 186, 188, each engageable with the drive shaft 180. The drive shaft 180 has a pivotally mounted retention member 190 that is pivotal between an engaging position, as shown in the drawing, wherein it extends into the recess 182 to engage with the piston shaft 184, and a disengaged position wherein it is substantially retracted within the wall of the drive shaft 180. The retention member 190 has a spring associated therewith (omitted for clarity) to bias the retention member 190 into its engaging position. In use as the end of the piston shaft 184 is inserted into the recess 182 in the end of the drive shaft 180, pressure exerted on the retention member 190 by the first protrusion 186 acts to pivot it from its engaged position into its disengaged position. Once the protrusion 186 has passed the retention member 190 its associated spring biases the retention member 190 back into its engaged position preventing the piston shaft 184 from being withdrawn. Continued insertion of the piston shaft 184 causes the second protrusion 188 to pass the retention member 190 in the same fashion. In its fully inserted position the retention member 190 is biased into its engaged position behind the second protrusion 188 preventing it from being withdrawn. When the drive shaft 180 is moved in direction “A” the retention member 190 acts against the protrusion 188 and draws the piston shaft 184 with it. When the drive shaft 180 moves in direction “B” the end of the recess 182 contacts the end face 192 of the piston shaft 184 driving it in the same direction, hence reciprocation of the drive shaft 180 will result in a corresponding reciprocation of the piston shaft 184. To disengage the piston shaft 184 from the drive shaft 180 a release member 194, arranged for relative motion to the drive shaft 180 contacts the outer end of the retention member 190 and acts on it so as to cause it to pivot from its engaged position into its disengaged position against the bias of its spring thereby allowing the piston shaft 184 to be withdrawn from the recess 182.

Figure 13:
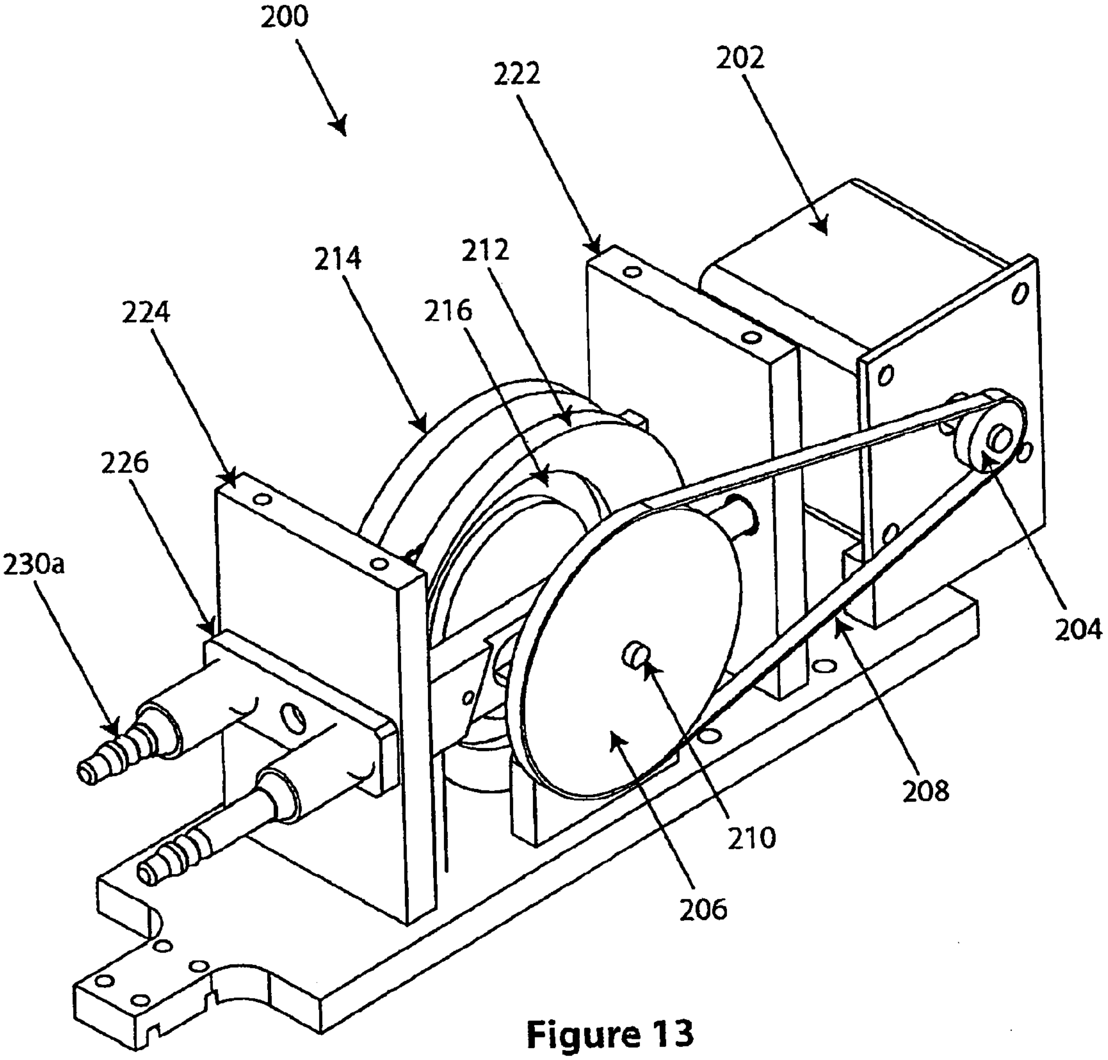
FIG. 13 is a perspective view of a second drive mechanism of the invention.
Figure 14:
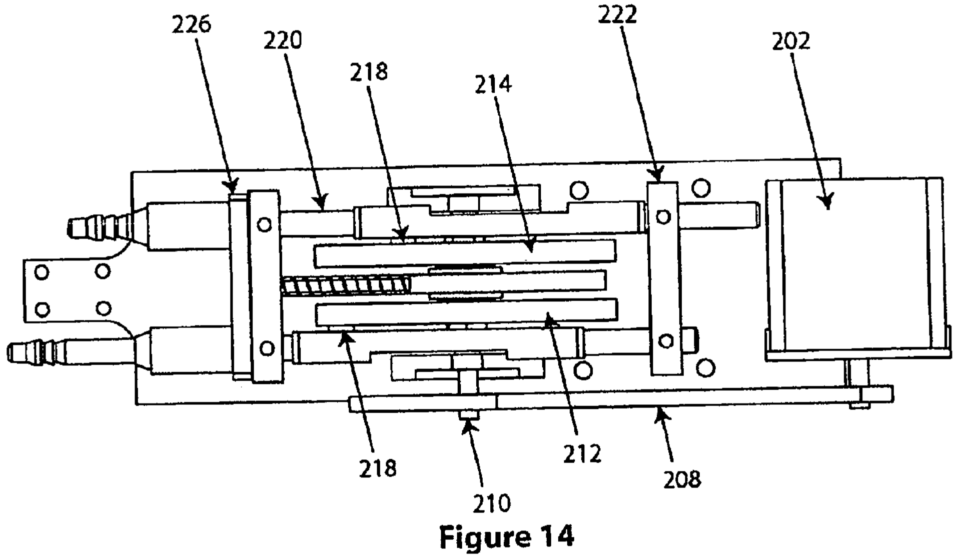
FIGS. 14 and 15 are side and top views of the drive mechanism of FIG. 13 respectively.
Figure 15:
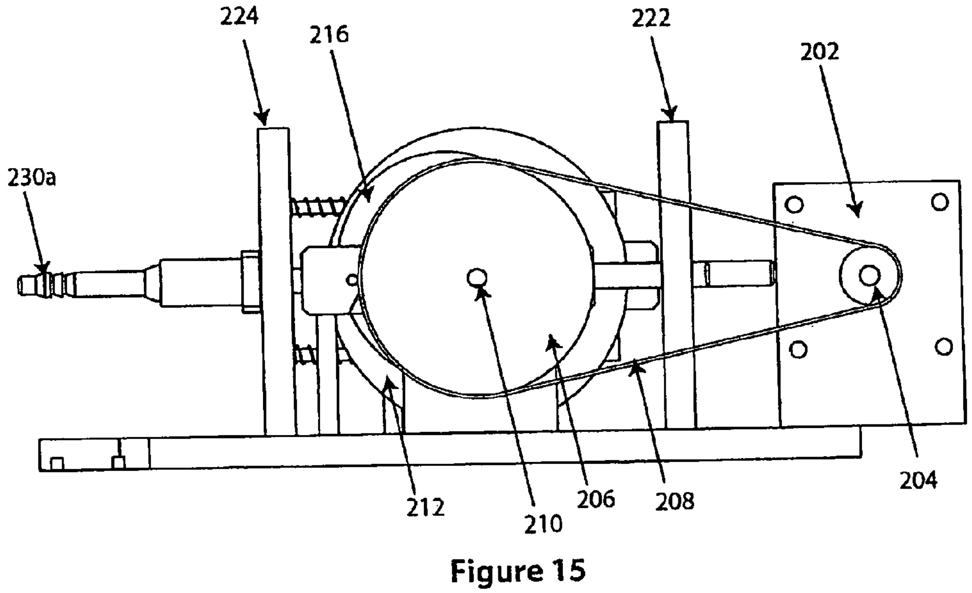

Referring to FIGS. 13 to 15 an alternative drive mechanism 200 of the invention is shown. A motor 202, having a motor wheel 204 drives a drive wheel 206 by means of a belt 208. The drive wheel 206 and the motor wheel 204 are toothed wheels (detail omitted for clarity) and the drive belt 208 is profiled (again omitted for clarity) to interface with the teeth of the two wheels so as to reduce the possibility of the belt slipping. The drive wheel 206 is larger that the motor wheel 204 so as to create a gearing ratio between the wheels resulting in the drive wheel 206 turning at a lower speed than the motor wheel 204 but having a greater torque. The drive wheel 206 is fixed on a shaft 210 that rotates with it. Also mounted on the shaft 210 are two cams 212, 214 each having a track 216 formed therein. Within each track 216 runs a follower 218 each of which connected to respective drive shafts 220 which are in turn retained within two bush plates 222, 224. As the followers 218 run in the cam tracks 216 the drive shafts 220 reciprocate in their bushes in a linear manner. The drive shafts 220 each have a profiled end 230*a* for engagement with the piston shaft (not shown) of a disposable cartridge as described in relation to FIGS. 3*a-e*.

The cam tracks 216 are profiled such that the reciprocal movement of the drive shafts 220 is slower in the outward direction than it is in the return direction. The two drive shafts 220 are simultaneously driven by the cams 212, 214 which are positioned on the shaft 210 such that the reciprocal motion of the two drive shafts 220 is out of phase with one another, that is to say the cam tracks 216 are profiled such that the return motion of the drive shafts 220 is faster than the outward motion so that there will be an overlap period twice per revolution of the shaft 210 whereby both the drive members 220 are moving in the outward direction resulting in a substantially continuous output of fluid from a disposable pump cartridge being driven by the drive mechanism 200. The cam track is profiled to match the acceleration and deceleration of the two drive shafts such that a substantially constant flow of fluid is pumped. The drive mechanism 200 also has a disengagement plate 226 which will be described in more detail in relation to FIGS. 16 and 17.

Figure 16:
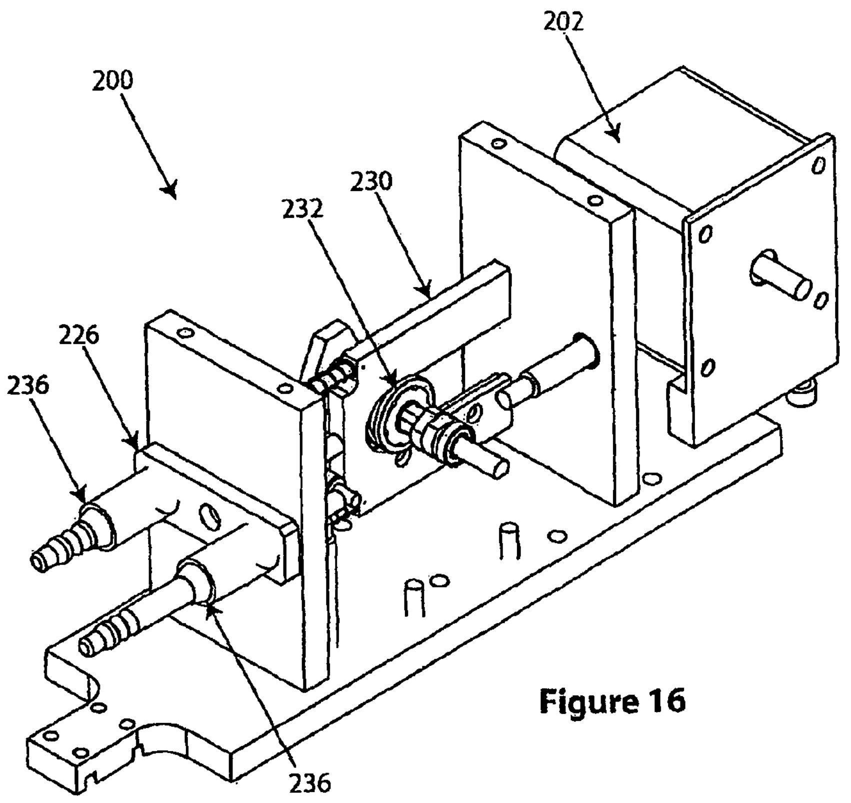
FIG. 16 shows a perspective view of the drive mechanism of FIG. 13 with the drive cams and the drive wheel removed.
Figure 17:
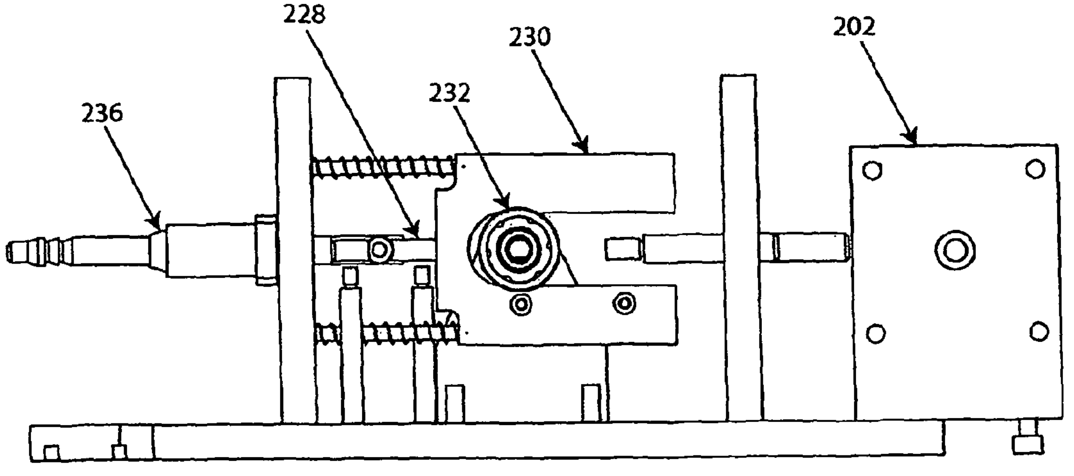
FIG. 17 shows a side view of the drive mechanism of FIG. 16.

Referring to FIGS. 16 and 17, a stripped version of the drive mechanism 200 is shown, with the motor drive wheel, drive wheel, cams, followers and a part of the drive shafts of FIGS. 13-15 removed to expose the drive means of the disengagement plate 226. The disengagement plate 226 is connected by means of a disengagement shaft 228 to a disengagement driver 230 that interacts with a sprag clutch 232. The sprag clutch is mounted on the shaft 210 such that during normal operation of the drive mechanism 200, the motor 202 rotates in a first direction to drive the drive members 220 (FIG. 13). When rotating in the first direction the shaft 210 rotates freely within the sprag clutch 232 and the disengagement connector 230 does not move. When the motor 202 is rotated in a second direction, opposite the first direction, the sprag clutch 232 engages with the shaft 210 and by means of a frictional contact drives the disengagement connector 230 forward to move the disengagement shaft 228 and thereby the disengagement plate and associated first and second strippers 236 as described with reference to FIG. 4. The rotation of the cams 212, 214 in the second direction continues to drive the drive shafts 220 (FIG. 13) in reciprocal motion, withdrawing them once they have been disengaged from the piston shaft (not shown) by the strippers 234, 236.

Alternative arrangements of the invention, for example different drive means for the engagement and disengagement means, and different piston retention means will be apparent to those skilled in the art and are intended to be covered by the scope of the invention.

The invention claimed is:

1. A disposable pump cartridge for use in a system including a pump drive mechanism, whereby the pump drive mechanism includes a reciprocating drive shaft that operates with a first movement and a second rearward movement, said disposable pump cartridge comprising:

at least one barrel having an inlet valve and outlet valve associated therewith at a from end of said barrel;

a retention mechanism positioned in said barrel that defines an operational portion and non-operational portion of said barrel, wherein said retention mechanism has a first axial distance from said front end of said barrel defining said non-operational portion;

a piston movable within said barrel from a non-operational position to a first operational position and a second operational position, said piston including a piston coupling mechanism having a first coupler adapted for moving the piston from its non-operational position, and a second coupler adapted to preclude the piston from returning to said nonoperational position during operation; wherein said retention mechanism releasably maintains the piston in the non-operational position;

a reciprocating shaft coupling mechanism that engages said first coupler of said piston coupling mechanism during said first movement, wherein said piston coupling mechanism has a from wall and said reciprocating shaft coupling mechanism has a second axial distance from said front wall that is greater than or equal to said first axial distance during said first movement;

wherein said piston moves to a second operational position during said second movement of said reciprocating shaft; and said reciprocating shaft coupling mechanism engages said second coupler of said piston shaft coupling mechanism during subsequent movement of said reciprocating drive shaft thereby precluding movement of said piston within said non-operational portion of said barrel.

2. The disposable pump cartridge according to claim 1 wherein:

the pump drive mechanism is further configured to return the piston to its nonoperational position within the retention means and to disengage the drive mechanism from the piston shaft.

3. The disposable pump cartridge according to claim 1, wherein:

said reciprocating shaft coupling mechanism comprises a first section, having a chamfered or radiused end, axially aligned with the drive shaft, for insertion into a hollow end of said piston shaft, such that, as the first section is inserted into the hollow end of the piston shaft, the end of the piston shaft deforms outwardly enabling said first section to pass into the end of the piston shaft, and a necked region axially aligned with said first section having a maximum diameter less than that of the first section such that, once the first section has passed into said hollow end, the piston shaft substantially returns to its undeformed position, the drive shaft thereby engaging with said piston shaft.

4. The disposable pump cartridge according to claim 3, further comprising:

a second section having a chamfered or radiused surface, said chamfer or radius facing the direction of insertion into the piston shaft, said second section adjacent and axially aligned with the first section, between the first second and the drive shaft, and wherein the maximum diameter of the second section is greater than the necked region, the necked region between the first and second sections; and a second necked region axially aligned with said second section haying a maximum diameter less than that of the first section.

5. A pump device comprising:

a drive mechanism having at least a first protrusion and a second protrusion, the drive mechanism being configured to reciprocate between a first position and a second position, and a disposable pump cartridge, the disposable pump cartridge further comprising:

at least one barrel having an inlet valve and outlet valve associated therewith at a front end of said barrel;

a retention mechanism positioned in said barrel that defines an operational portion and a non-operational portion of said barrel, wherein said retention mechanism has a first axial distance from said front end of said barrel defining said non-operational portion;

a piston movable within said barrel from a non-operational position to it first operational position and a second operational position; and a piston shaft attached to said piston and having a hollow end with a tapered entrance, the tapered entrance being aligned to receive the first protrusion and the second protrusion of the drive mechanism, wherein said first protrusion engages said piston shaft when said drive mechanism has reciprocated to said first position, said piston shaft has a front wall, and said first protrusion has a second axial distance from said front wall that is greater than or equal to said first axial distance when said drive mechanism has reciprocated to said first position;

wherein the space between the first protrusion and the second protrusion of the drive mechanism is sufficient to position the piston on the non-operational side of the retention mechanism when the piston shaft is engaged with only the first protrusion and on the operational side of the retention mechanism when the piston shaft is engaged with the second protrusion.

6. The pump drive of claim 5, wherein the drive mechanism is an elongated shaft and the first and second protrusions are cones.

7. The pump drive of claim 5, wherein the first protrusion is a cone affixed to an end of the drive mechanism.

* * * * *